F. A. FOSTER.
HOSE REEL.
APPLICATION FILED JULY 8, 1912.
1,096,232.
Patented May 12, 1914.
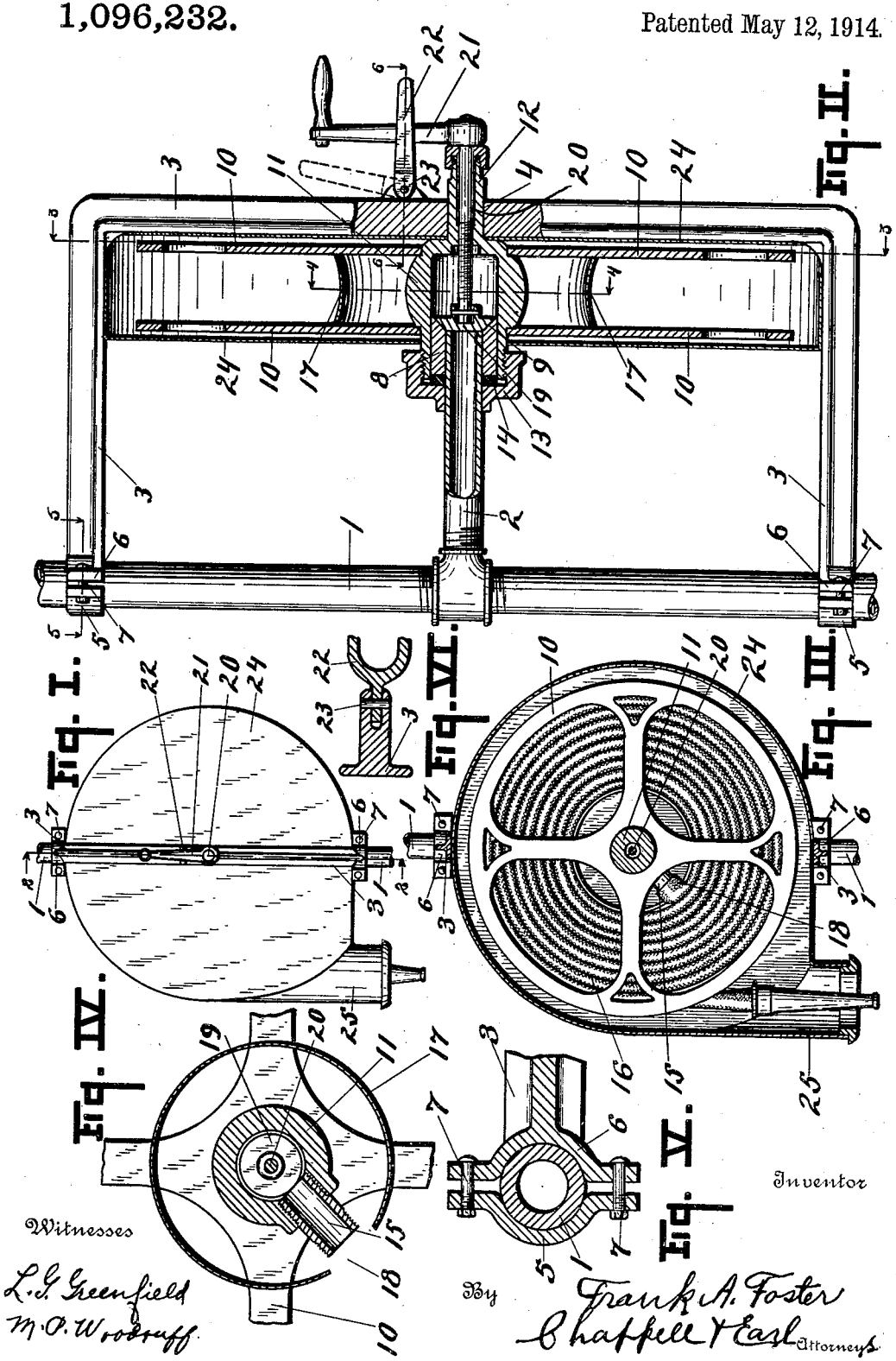

UNITED STATES PATENT OFFICE.

FRANK A. FOSTER, OF BATTLE CREEK, MICHIGAN.

HOSE-REEL.

1,096,232.　　　　　Specification of Letters Patent.　　Patented May 12, 1914.

Application filed July 8, 1912. Serial No. 708,201.

*To all whom it may concern:*

Be it known that I, FRANK A. FOSTER, a citizen of the United States, residing at the city of Battle Creek, county of Calhoun, and State of Michigan, have invented certain new and useful Improvements in Hose-Reels, of which the following is a specification.

This invention relates to improvements in hose reels.

The main objects of this invention are,— First, to provide an improved hose reel connected to a delivery pipe in which the unwinding of the hose opens the delivery valve.
Second, to provide an improved hose reel having these advantages, which permits the closing of the delivery valve prior to rewinding the hose upon the reel. Third, to provide an improved hose reel of the class described, which is simple and economical in structure and not likely to get out of repair.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which—

Figure I is a front elevation of a structure embodying the features of my invention, the supply pipe 1 being shown broken away. Fig. II is a detail view partially in vertical section on a line corresponding to line 2—2 of Fig. I. Fig. III is a detail section on a line corresponding to line 3—3 of Fig. II. Fig. IV is a detail section on a line corresponding to line 4—4 of Fig. II. Fig. V is a horizontal detail section on a line corresponding to line 5—5 of Fig. II, showing means for securing the frame to the supply pipe. Fig. VI is a detail section on a line corresponding to line 6—6 of Fig. II.

In the drawing, similar reference characters refer to similar parts throughout the several views, and the sectional views are taken looking in the direction of the little arrows at the ends of the section lines.

Referring to the drawing, 1 represents the supply pipe which is provided with a later-ally disposed delivery pipe or arm 2. The frame 3 is mounted upon the pipe 1 and provided with a bearing 4 opposite the delivery pipe 2. The frame 3 is secured to the pipe 1 by means of the clips 5 connected to ears 6 on the frame by means of the bolts 7.

On the delivery pipe 2 is a bearing 8 having a valve seat 9 at its inner end. The reel 10 is provided with a hub 11 adapted as a valve casing, the hub being mounted upon the bearing 8 and provided with a journal 12 arranged in the bearing 4 of the frame.

The hub is provided with a packing gland 13 at its inner end which clamps the gasket 14 against the outer end of the bearing 8 closing the joint between the hub and the bearing and the bearing and the pipe. The hub 11 is provided with a hose nipple 15 which projects radially from the hub. The inner end of the hose 16 is secured to this nipple as shown in Fig. III.

The reel is provided with a drum 17 having an opening 18 opposite the nipple. The valve 19 is swiveled upon the inner end of the valve stem 20 which is threaded longitudinally in the journal 12. The valve stem is provided with a crank 21 and with a catch 22 which is pivotally mounted on the frame at 23 to engage the crank 21, and thus lock or hold the stem against rotation. The reel is preferably provided with a casing 24, having a tangentially disposed guide 25 through which the hose is drawn from the reel.

In the accompanying drawing, the valve is shown closed. With the parts arranged as shown in the drawing, the valve is opened by unreeling the hose, thus admitting the water to the hose. By disengaging the catch 22, the crank 21 may be turned to close the valve stem and after the valve is seated, continued turning of the crank will revolve the reel to rewind the hose.

I have illustrated and described my improvements in a simple and practical embodiment thereof. I have not attempted to illustrate or describe the various adaptations and modifications which I contemplate as such modifications and adaptations will be readily understood by those skilled in the art to which this invention relates. I desire however, to be understood as claiming my improvements specifically in the form illustrated as well as broadly within the scope of the appended claims.

Having thus described my invention, what I claim as new and desire to secure by Letters Patent is:

1. In a hose reel, the combination with the supply pipe provided with a laterally projecting delivery arm; a frame mounted on said pipe and provided with a bearing opposite said delivery arm; a bearing on said delivery arm having a valve seat at its inner end; a reel; a hub for said reel adapted as a valve casing and having a hose attaching nipple, said reel being provided with a drum surrounding said hub, the drum having an opening opposite the nipple, said hub being mounted on said bearing on said delivery arm and having a journal at its outer end arranged in said bearing in said frame; a valve; a valve stem threaded longitudinally through said reel hub journal and having swivel connection with said valve; a crank on said valve stem; a catch for said valve stem pivotally mounted on said frame to engage said crank; and a casing for said reel provided with a tangentially disposed hose guide.

2. In a hose reel, the combination with the supply pipe provided with a laterally projecting delivery arm; a frame mounted on said pipe and provided with a bearing opposite said delivery arm; a bearing on said delivery arm having a valve seat at its inner end; a reel; a hub for said reel adapted as a valve casing and having a hose connection, said hub being mounted on said bearing on said delivery arm and having a journal at its outer end arranged in said bearing in said frame; a valve; a valve stem threaded longitudinally through said reel hub journal and having swivel connection with said valve; a crank on said valve stem; and a catch for said valve stem pivotally mounted on said frame to engage said crank.

3. In a hose reel, the combination with the delivery pipe, of a frame provided with a bearing opposite said delivery pipe; a bearing on said delivery pipe having a valve seat at its outer end; a reel; a hub for said reel adapted as a valve casing and having hose connections, said hub being mounted on said bearing on said pipe and having a journal at its outer end arranged in said bearing in said frame; a valve; a valve stem threaded longitudinally through said reel hub journal and having swivel connection with said valve; and a catch on said frame for said valve stem.

4. In a hose reel, the combination with the delivery pipe, of a frame provided with a bearing opposite said delivery pipe; a reel; a hub for said reel adapted as a valve casing and having hose connections, said hub being mounted on said pipe and having a journal at its outer end arranged in said bearing in said frame; a valve; a valve stem threaded longitudinally through said reel hub journal and having swivel connection with said valve; and a catch on said frame for said valve stem.

In witness whereof, I have hereunto set my hand and seal in the presence of two witnesses.

FRANK A. FOSTER. [L. S.]

Witnesses:
   I. W. Schram,
   E. D. Schram.

---

Copies of this patent may be obtained for five cents each, by addressing the "Commissioner of Patents, Washington, D. C."